United States Patent [19]
Woods et al.

[11] Patent Number: 5,280,430
[45] Date of Patent: Jan. 18, 1994

[54] COMPUTER-AIDED TRANSCRIPTION SYSTEM PROVIDING INDIVIDUALIZED ELECTONIC MARKING OF STENOGRAPHIC RECORDS

[75] Inventors: Jerome Woods, Irvine, Calif.; Earl Ravid, Bayville, N.Y.; Leonard Genest, Santa Anna, Calif.

[73] Assignees: Tariq Chaudhary; Gigatron Software Corporation, Inc., both of Irvine, Calif.

[21] Appl. No.: 722,149

[22] Filed: Jun. 27, 1991

[51] Int. Cl.$^5$ ............................................. G06F 15/38
[52] U.S. Cl. ...................................... 364/419; 400/91
[58] Field of Search .......................... 360/13, 33.1, 71; 400/91, 93, 94; 364/419

[56] References Cited

U.S. PATENT DOCUMENTS

| | | | |
|---|---|---|---|
| 3,736,568 | 9/1973 | Snook | 364/DIG. 2 |
| 3,798,387 | 3/1974 | Gallagher, Jr. | 360/79 |
| 3,869,576 | 3/1975 | Griggs | 381/44 |
| 3,879,751 | 4/1975 | Gimelli | 360/13 |
| 3,905,042 | 9/1975 | Johnson | 360/71 |
| 4,024,943 | 5/1977 | Steiner | 400/91 |
| 4,176,973 | 12/1979 | Gregory et al. | 400/91 |
| 4,363,557 | 12/1982 | Fowler et al. | 400/91 |
| 4,439,798 | 3/1984 | Chvojcsek | 360/4 |
| 4,692,042 | 9/1987 | Cuff et al. | 400/94 |
| 4,858,170 | 8/1989 | DeWick, Sr. et al. | 364/419 |
| 4,924,387 | 5/1990 | Jeppesen | 364/409 |

Primary Examiner—Roy N. Envall, Jr.
Assistant Examiner—A. Bodendorf
Attorney, Agent, or Firm—Price, Gess & Ubell

[57] ABSTRACT

A system for providing a textual record of spoken words. The textual record having reference markings selectively provided by a plurality of system users. Keystrokes are inputed under the control of a first user which are representative of spoken words, thereby providing a plurality of stroke signals. Substantially simultaneous input of responses to the spoken words from at least a second user independant of the control of the first user, thereby providing a plurality cf reference signals corresponding to the stroke signals.

13 Claims, 12 Drawing Sheets 68 bn
75 bk
90 bf
94 bf
96 bf
111 bc
114 bc
150 bj
170 bi
174 bi
→ 185 be →  
191 ba
194 bb
201 bc
248 bk
263 bg
331 bo
354 bn

```
 1    Q.  Officer, did you complete a police report at the time
 2  of this incident?
 3    A.  Yes, I did.
 4    Q.  When you spoke to Mr. Warren Chappell?
 5    A.  Yes, I did.
 6    Q.  And did you put in specific quotes as to what he told
 7  you in your police report?
 8    A.  Yes, I did.
 9    Q.  Do you remember if he gave you a specific identifica-
10  tion of the second person who allegedly was involved in this
11  incident?
12    A.  Yes, I do recall.
13  MR. BRADYS:  Nothing further, Your Honor.
14  THE COURT:  Redirect, Mrs. Harris?
15  MRS. HARRIS:  Just briefly, Your Honor.
16              REDIRECT EXAMINATION
17  BY MRS. HARRIS:
18    Q.  Officer Hill, in your experience and training with
19  regard to people who are selling drugs on the street, would it
20  be fair to say that there are people who are out there who
21  approach people, who make the offer to sell, and after the
22  person agrees that they are looking, they make a connection or
23  send them to someone else to get the drugs?
24    A.  I'm sorry, I lost you on that.
25    Q.  In your training and experience, the people who are
26  actually out there on the streets to sell the drugs, would it
```

C7

C2

C1

4

FIG. 10a (same content as FIG. 10a)

COMPUTER-AIDED TRANSCRIPTION SYSTEM PROVIDING INDIVIDUALIZED ELECTONIC MARKING OF STENOGRAPHIC RECORDS

BACKGROUND OF THE INVENTION

The present invention generally relates to stenographic transcribers and computer-aided transcription (CAT) systems of the type used by court reporters. More particularly, the present invention is an improved CAT system which provides a method and means for facilitating the marking of reference characters on a stenographic transcript by persons other than the stenographic reporter.

For many years, stenography has been widely used for making a written transcript of the verbally-conducted proceedings in court rooms, depositions, and business meetings. Basically, a stenographic writing machine, which is similar to a typewriter, is used for making a phonetic record of the spoken communications heard by the stenographic machine operator during the proceedings. These stenographic reporters, such as court reporters, are trained and certified to capture a verbatim record of all testimony at such proceedings. The stenographic writer is usually equipped with a continuous paper tape printing device, which prints the phonetic representation, i.e., "strokes," of what was recorded during the proceedings. The stenographic reporter is then responsible for transcription of the paper tape record from its phonetic form into a human-readable printed transcript in the appropriate language.

The advent of microcomputers and inexpensive personal computers (PC's) has greatly expanded the capability of stenographic machines and, accordingly, has significantly enhanced the productivity of stenographic reporters. In addition to performing the functions of capturing and printing a phonetic record of the proceedings, modern stenographic machines are equipped with electronic storage capabilities, such as tape drives, disk drives, and random-access-memory (RAM). In some cases, the stenographic writer may also include direct electronic communications capability, such as serial or parallel communication ports.

After the proceedings are over, the stenographic reporter who is equipped with computer-aided transcription software running on a dedicated or personal computer, can transfer the phonetic information to the computer by tape, disk, or direct electronic communication. By using a personalized dictionary of phonetic translations, the stenographic reporter can then translate the phonetic information into a textual record in document form. The textual record is then input into a word processor program for editing. Printed transcripts, which are the end product of the stenographic reporter's work, are then made available upon request at a price to individuals. The basic functions of the typical CAT system, namely, the inputting, printing, and storing of phonetic strokes entered by a stenographic reporter, the translation of the phonetic strokes into textual form, and the editing and printing of the transcripts, are readily understood by those skilled in the art of CAT systems.

Stenographic reporters frequently desire to mark the paper tape produced by the stenographic writer to indicate a portion of the testimony for later reference. In the past, this procedure has been accomplished by merely marking the paper tape with a pen or pencil, or by slightly tearing the paper at its margin. In the alternative, several prior art devices have been made available for marking the paper tape. For example, U.S. Pat. No. 4,363,557 issued to Fowler et al. describes a paper tape marking device for a shorthand machine, wherein the activating keys for the marking device are located in close proximity to the shorthand machine keyboard such that the machine operator may activate the device with minimal interruption of the recording process. Another prior art device has addressed the problem of identifying for future reference a portion of an electronic data record as it is being recorded by the stenographic machine. U.S. Pat. No. 4,439,798 issued to Chvojcsek describes a referencing device for a shorthand machine, wherein a magnetically-influenced reed switch provides an electrical output signal for encoding a referencing bit into a recording medium at an identifiable memory address.

However, the prior art apparently does not address the corresponding problem encountered by other parties at the proceedings such as attorneys and paralegal professionals—that of marking the transcript for purposes of their own reference. For example, an attorney may wish to highlight particular issues raised during a deposition, or an executive may need to note special topics discussed during a business meeting which must be addressed at a later date, or a paralegal may desire to keep track how each piece of evidence is handled during a trial. In order for these parties, other than the stenographic reporter, to reference a particular portion of the transcript, they must utilize handwritten notes taken during the proceedings. Then their handwritten notes must be correlated with the final printed transcript provided by the stenographic reporter. Countless hours are spent pouring over printed transcripts searching for the particular topics or issues of interest.

A need, therefore, exists for a method and means for facilitating the referencing of stenographic transcripts by persons present at the proceedings other than the stenographic reporter.

OBJECTS AND SUMMARY OF THE INVENTION

Accordingly, it is a general object of the present invention to provide the capability to anyone present at the proceedings to individually mark the electronic stenographic record in a computer-aided transcription system.

A more particular object of the present invention is to provide a CAT system wherein any number of persons may mark the electronically-stored stenographic record with unique codes, such that the stenographic reporter can produce personalized transcripts having only the individualized markings attributable to that person.

A further object of the present invention is to provide such an individualized electronic marking capability for CAT systems which can be implemented with minimal changes to existing CAT equipment.

In accordance with the present invention, a computer-aided transcription system is provided which has the capability to allow individualized electronic marking of the stenographic record by system users other than the stenographic reporter. Briefly stated, the CAT system of the present invention includes: a stenographic writer for providing stenographic signals under the control of a stenographic operator; a plurality of multiple-key electronic keypads, one for each user; a keypad control processor for monitoring all of the keypads and providing reference signals whenever any keys are pressed; a memory for storing the stenographic signals and the reference signals; a program for translating the stenographic signals into textual codes and for translating the reference signals into reference codes; and a program for printing the individualized transcripts for the system users from the textual codes and the reference codes, wherein each of the transcripts has a plurality of reference characters strategically placed at a location within the transcripts corresponding to the occurrence of only one particular individual user's responses. In this manner, the user may then visually scan the transcript for their unique referencing characters placed in the margins, thus saving a significant amount of time and effort.

In a first embodiment of the invention, a personal computer running a CAT real-time transcription program is present at the proceedings. A stenographic reporter would enter the verbatim phonetic information into a real-time stenographic writer connected to the personal computer by a serial communications link. The personal computer translates the stenographic strokes into textual codes in real time. Simultaneously, a keypad controller monitors up to 16 keypads, each having 16 keys, to detect which of the keys has been pressed by the other users of the system. The keypad controller outputs certain reference codes into the PC's keyboard buffer and then interrupts the real-time translation program. The CAT translation program examines the keyboard buffer information for the reference codes, and stores the reference codes along with the specific stroke number in a separate file.

Hence, the phonetic stroke information entered from the stenographic writer is combined with the reference codes which indicate which keypad and key were pressed. This combined information is subsequently stored on the personal computer's hard disk or floppy disk. Once the combined file has been produced, the system operator edits the transcript in a word processing program, and prints the transcript using a CAT printer utility software which is capable of interpreting the reference codes and selecting only those reference codes chosen by the system operator. Thus, the printed transcript includes reference characters in the margins for use by that particular user to identify a portion of the proceedings corresponding to when he or she responded to the keypad, and further to identify which key was pressed. Moreover, privacy is maintained within the system, since each individual transcript includes only that particular user's reference characters.

In a second embodiment of the present invention, only the stenographic writer, keypad controller, and plurality of keypads would have to be present at the proceedings. In this embodiment, once a key on an individual's keypad is pressed, the keypad controller outputs a reference signal directly to the stenographic writer via its serial port. The stenographic writer converts the signal to a reference code, and stores the reference code on a floppy disk along with the phonetic information input by the stenographic reporter. Once the proceedings are over, the system operator then removes the floppy disk from the stenographic writer, and inserts it into the floppy drive of a personal computer which may be at a different location. A disk reader utility program is then used to separate the reference codes from the stenographic information, and the CAT translation, editing, and printing operations are performed as described above.

The present invention is particularly adapted for use in court or deposition proceedings, wherein each attorney has the capability of individually marking his own transcript with one of sixteen different reference characters. For example, a particular attorney would create a list of possible topics or issues of interest, number them, and then press the corresponding keypad number during the proceedings. It is important to note that complete privacy is maintained by the system, since the CAT printer utility program selects only those reference codes corresponding to one keypad, i.e., the user of keypad number 4 will not be provided with a transcript having reference characters inserted by the user of keypad number 3.

Numerous other advantages and features of the invention will become readily apparent from the detailed description of the preferred embodiment of the invention, from the claims, and from the accompanying drawings, in which like numerals are employed to designate like parts throughout the same.

BRIEF DESCRIPTION OF THE DRAWINGS

The features of the present invention which are believed to be novel are set forth with particularity in the appended claims. The invention itself, however, together with further objects and advantages thereof, may best be understood with reference to the following description when taken in conjunction with the accompanying drawings, in which:

FIGS. 10a and 10b are sample pages from a printed transcript illustrating the location and form of the reference characters;

DETAILED DESCRIPTION OF THE PREFERRED EMBODIMENTS

Figure 1:
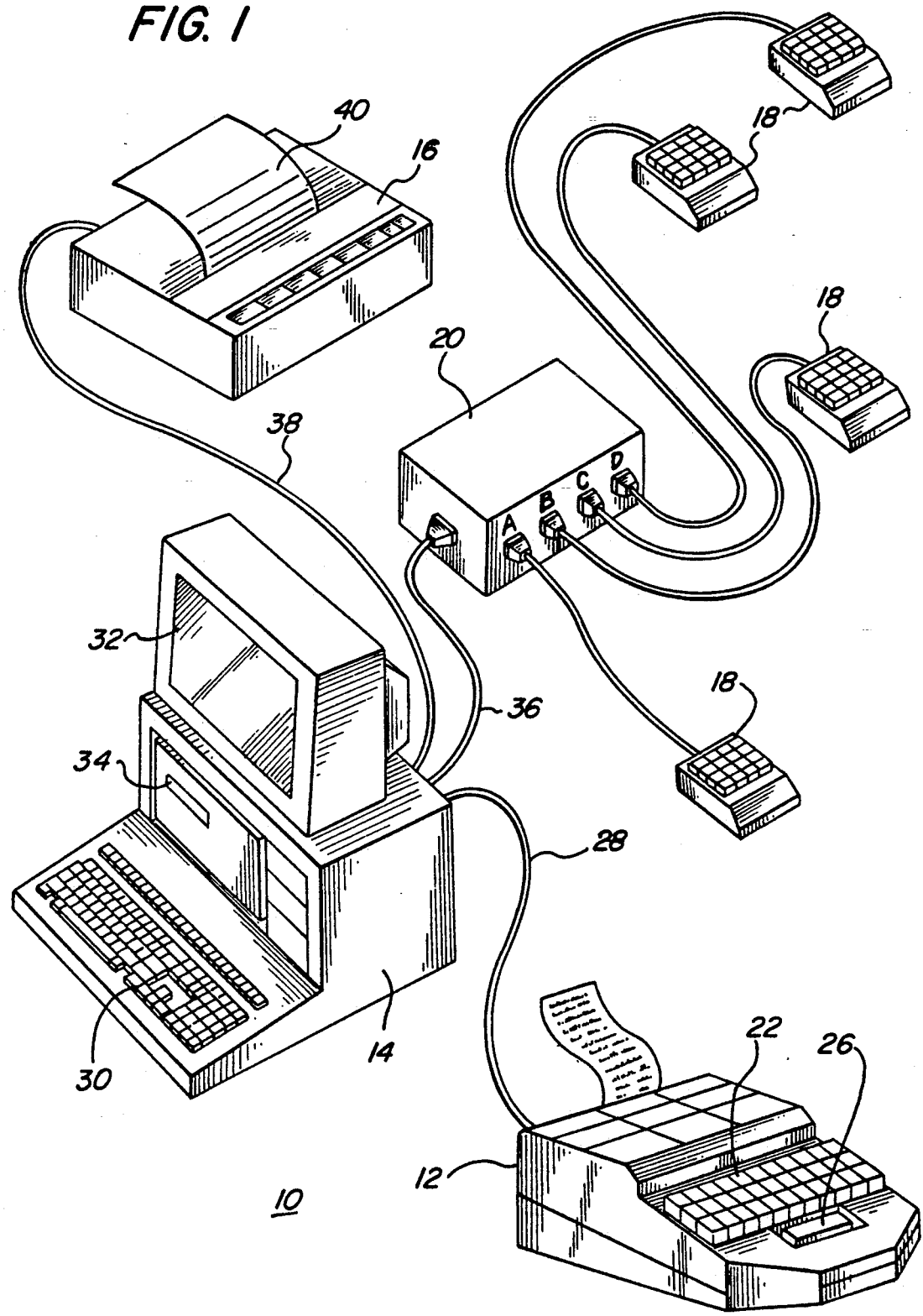
FIG. 1 is a pictorial representation illustrating one embodiment of the computer-aided transcription system according to the present invention.

While the invention is susceptible of embodiment in many different forms there is shown in the drawings and will be described herein in detail, a preferred embodiment of the invention. It should be understood, however, that the present disclosure is to be considered an exemplification of the principles of the invention and is not intended to limit the spirit and scope of the invention and/or claims of the embodiment illustrated.

Referring now to the accompanying drawings, FIG. 1 shows a pictorial representation of the computer-aided transcription (CAT) system 10 according to the present invention. Basically, the system comprises a stenographic writer 12, a portable computer 14, a printer 16, a plurality of keypads 18, and a keypad controller 20. Although all elements of system 10 are shown in FIG. 1, it is not necessary that all elements be present at the specific proceedings. For example, the stenographic writer 12 may be coupled directly to the keypad controller 20 while the personal computer 14 and the printer 16 remain at a different location, depending upon the particular configuration of the system. In the configuration shown in FIG. 1, the stenographic record produced by the stenographic writer 12 is translated by the personal computer 14 in real-time. If desired, the stenographic reporter can print out a "dirty copy" of the transcript using printer 16 immediately upon the completion of the deposition or court proceedings. As will be seen below, numerous other modifications of system 10 are also possible.

The stenographic writer 12, also known as a shorthand machine, is an electromechanical device having keys 22 positioned for use by the stenographic reporter. Each key represents a specific stenographic symbol, which, individually or in combination, represents phonetic sounds equivalent to portions of spoken vocabulary. The stenographic writer 12 typically has a built-in mechanical printer for producing a paper tape 24. Modern stenographic writers also include an internal central processing unit (CPU), random access memory (RAM), programmable read-only memory (PROM), electronic communications capability (serial, parallel, modem, or other type of ports), permanent storage capability (e.g., hard disk drive, floppy disk drive, nonvolatile memory, etc.), and may even include a visual display 26. An example of a stenographic writer which could be used in the real-time translation embodiment of the present invention would be the "Smart Writer" available from Stenograph Corporation, Skokie, Illinois. According to the present invention, the stenographic writer 12 is coupled via cable 28 from its serial port to either the personal computer 14 or the keypad controller 20, depending upon the system configuration.

Numerous types of personal computers can be used for the personal computer 14 of system 10. Preferably, any brand of personal computer can be used that is 100% compatible with the IBM-PC family of computers, having at least 640K of RAM, 20MB of hard disk storage, one 3½ inch floppy disk drive, one parallel port, and one serial port. If real-time transcription is desired, it may be preferable to utilize a laptop model as shown in FIG. 1. The laptop computer typically has a keyboard 30, a flip-up LCD display 32, and a 3½ inch floppy disk drive 34. The PC 14 is coupled to the keypad controller 20 via an eight-or ten-conductor cable 36 as will be described below.

A printer 16 may be connected to the PC via cable 38 through either a serial or parallel port. In the preferred embodiment, the PC's parallel port is used. As will be explained in detail below, the PC performs the functions of translating the stenographic information into textual information, editing the text, receiving the reference code information, and printing the combined information to obtain a hard copy transcript 40 having reference characters thereon.

A number of keypads 18, one for each system user (other than the stenographic reporter), are positioned at a convenient location which is readily accessible to the user. Each keypad 18 has a plurality of keys 42. In the preferred embodiment, up to sixteen keypads each having sixteen keys are used. The keys are similar in appearance and operation to those found on an IBM-PC keyboard. Each keypad 18 is attached to a unique input port connector on the keypad controller 20 by an eight-conductor wire 44. Portions of the circuitry of the keypad controller 20 could alternatively be contained completely within each of the keypads 18, such that the keypads could be connected directly to the PC 14.

Moreover, it should be noted that the transmission of information from the keypads 18 to the keypad controller 20 may alternatively be accomplished using radio frequency waves, infrared light, or other wireless communications techniques. Such wireless communications might be required in a courtroom setting, as opposed to a deposition setting. In a courtroom, each attorney would have his own wireless keypad, which would transmit the reference code information to a centralized keypad controller in much the same way one changes the channel on a television using the remote control keypad. Using any of these alternatives, the keypads perform the function of substantially simultaneously inputting the user's responses to the spoken words during the proceedings. Such responses can be obtained from any number of users of the system, each being independent of each other, and further being independent of the control of the stenographic reporter.

The keypad controller 20 serves the function of constantly monitoring all of the keys 42 on the plurality of keypads 18, and outputting reference signals to the personal computer 14 or the stenographic writer 12. Keypad controller 20 works in conjunction with a scan controller program such that the keys 42 of the individual keypads 18 are scanned as individual points of a matrix. Depending upon the number of keypads and/or the number of keys per keypad, the scan controller can be adapted to scan virtually any size matrix. As will be shown below, up to sixteen keypads, each having up to sixteen keys, can be scanned using the circuitry illustrated and described below in FIG. 4.

Figure 2:
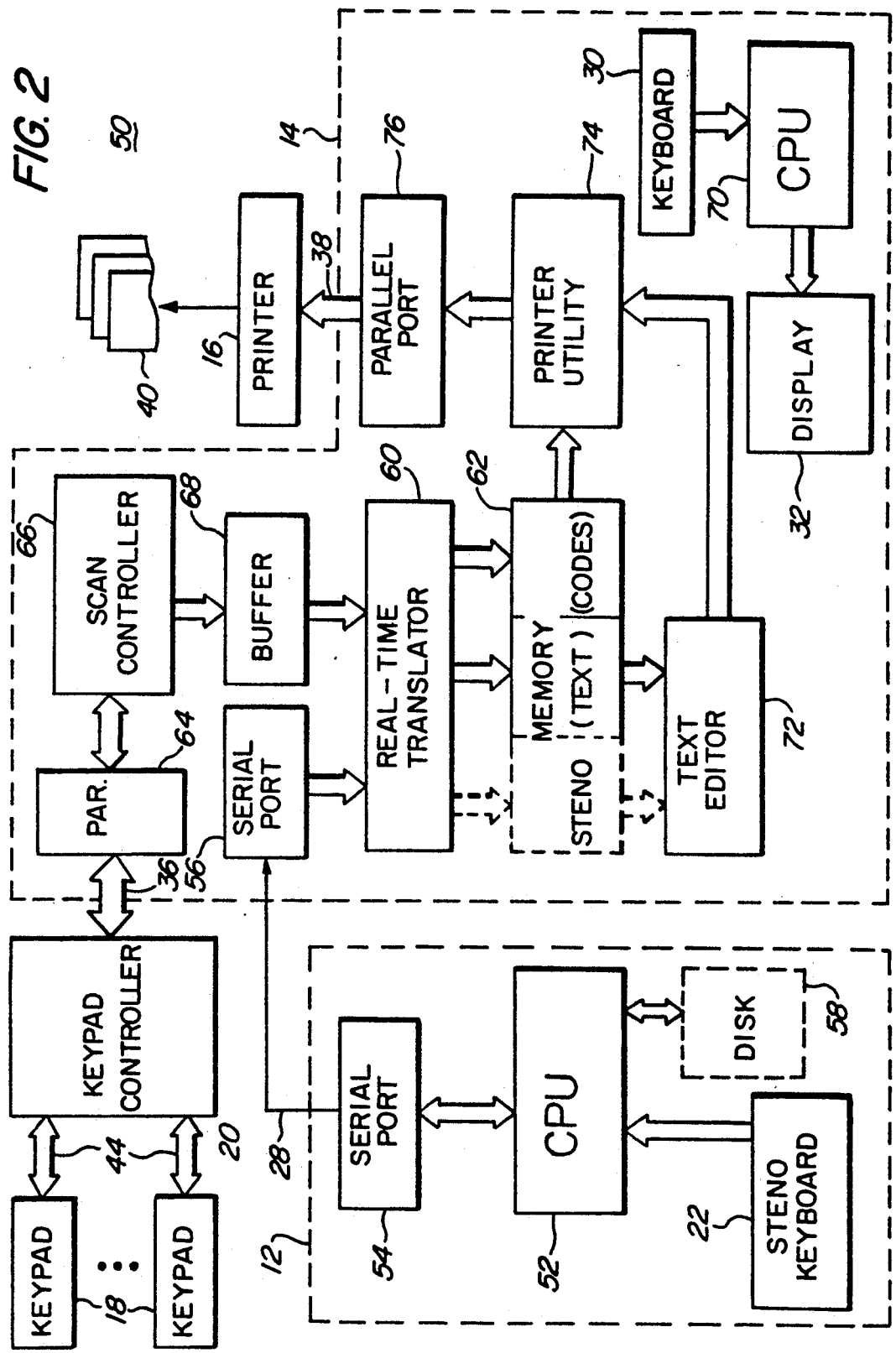
FIG. 2 is a block diagram of one embodiment of the CAT system of the present invention, wherein real-time translation equipment is utilized.

FIG. 2 illustrates one embodiment 50 of the CAT system utilizing real-time translation equipment. In this embodiment, the stenographic writer 12 is directly coupled to the PC 14 via their serial communications ports, and the keypad controller 20 is coupled to the PC via the PC's parallel communications port. Hence, to retrofit the present invention into existing CAT equipment, no hardware modifications need to be performed to either the PC 14 or the stenographic writer 12.

As the stenographic reporter inputs phonetic stroke information into steno keyboard 22, the program running on CPU 52 (See FIG. 11) instructs the stenographic writer's serial port 54 to output stenographic signals to the serial port 56 of the PC. This process can be accomplished using the industry standard RS232 serial communications protocol at speeds up to 19.2 k baud. The stenographic stroke information may also be stored in memory within the stenographic writer 12, such as on floppy disk 58. The PC, running a real-time translation program 60, reads the sequence of phonetic strokes from the serial port 56 and translates these stenographic strokes into textual form, and stores it in a text file in memory 62. If an IBM-PC is used running either PC-DOS or MS-DOS operating systems, the textual form would utilize the industry standard ASCII strokes. If desired, the stenographic codes themselves may also be stored in memory 62. Further operation of the real-time translator program 60 will be described below in conjunction with FIG. 7.

As mentioned above, a number of keypads 18, each having a plurality of keys, are connected to keypad controller 20. In turn, the keypad controller, in this embodiment, is coupled to the parallel port 64 of the PC via cable 36. The particular connections will be explained in detail below. The scan controller program 66, running as a resident program on the PC, interfaces with the hardware in the keypad controller 20 to perform the scanning of the keypad matrix. This results in the inputting of a number of reference signals, each corresponding to the particular keys that were pressed by the users. The scan controller program 66 converts these reference signals into reference codes, and stores the reference codes in the keyboard buffer 68 of the PC. The technique of storing information in the keyboard buffer from the parallel port is commonly used in the PC industry. The scan controller program 66 is executed as a terminate and state resident program on the PC timer interrupt chain. This gives the program the appearance of running continuously, allowing the CPU 70 of the PC to execute other programs normally. Upon the occurrence of an interrupt, the real-time translator program 60 reads the keyboard buffer 68 and stores the reference codes and current stenographic stroke number in a reference code file in memory 62.

After the proceedings are over, the CAT system operator utilizes the text editor program 72 to edit the text file, which is similar to word processing. The printer utility program 74 combines the edited text file and the reference code file, selects only those reference codes provided by the identified user, and outputs the combined file to the parallel printer port 76. Note that a single parallel port 76 can also perform the function of parallel port 64, since they are both under control of the CPU 70, and since printing is not normally performed during the proceedings. The printer utility program 74 will be explained below in conjunction with FIG. 9.

Finally, the printer 16 outputs the printed transcript 40 having the reference characters strategically placed at locations within the textual record which correspond to the time when the users pressed the keypad keys. A sample printed transcript is shown below in FIGS. 10a and 10b.

Figure 3:
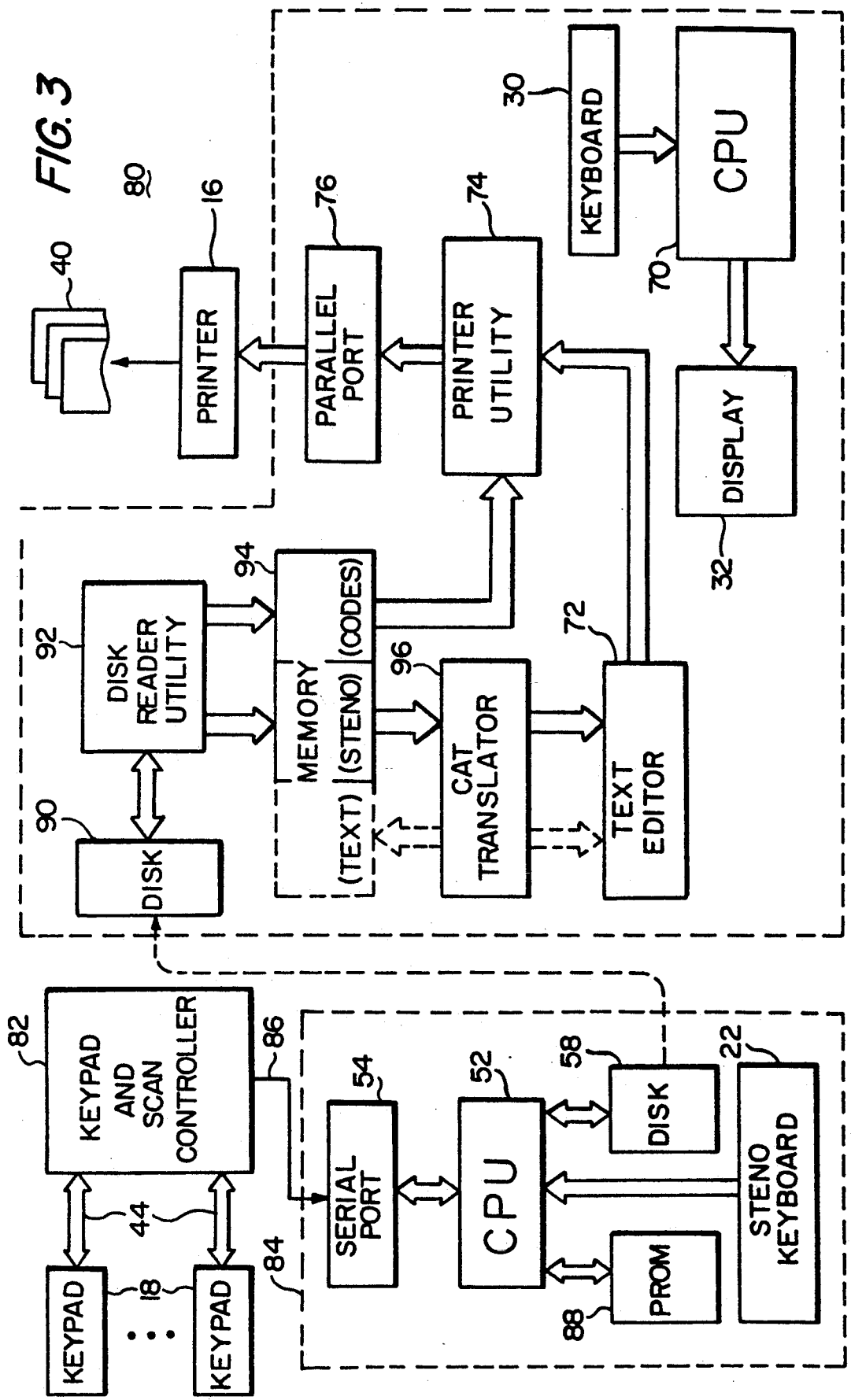
FIG. 3 is a block diagram of another embodiment of the CAT system of the present invention, wherein a floppy disk is transferred from the stenographic writer to the personal computer.

An alternate embodiment of the invention is shown in FIG. 3, wherein CAT system 80 does not perform real-time translation. Instead, the stenographic reporter stores the stenographic information on a floppy disk, and transfers the floppy disk to the PC for CAT translation at a later time. Consequently, the scan controller program, previously residing in the PC, now resides in the keypad and scan controller 82 as shown. The keypad and scan controller 82 includes its own microcomputer for scanning the keypad matrix and for outputting the reference signals to the stenographic writer 84 via serial line 86. This can readily be accomplished using the RS232 serial protocol. The hardware circuitry for the keypad and scan controller 82 will be discussed in detail in accordance with FIGS. 4 and 5, and its software program will be explained in conjunction with FIG. 6.

The stenographic writer 84 of FIG. 3 includes a programmable read only memory (PROM) 88 for containing the program which performs the inputting and converting of the reference signals from the keypad & scan controller 82. A state diagram of the software for the stenographic writer 84 will be discussed in accordance with FIG. 11. Briefly, however, the CPU 52 monitors the steno keyboard 22 for stenographic information signals, and monitors the serial port 54 for reference signals. Upon the occurrence of either of these events, the signals are converted into stenographic and reference codes, respectively, and stored on a floppy disk 58.

Upon completion of the proceedings, the floppy disk from the stenographic writer 84 can be read by disk drive 90 of the PC, and its contents input via a disk reader utility program 92. Although the operation of the disk reader utility program will be discussed in more detail in accordance with FIG. 12, it is sufficient to say that the disk reader utility 92 separates the stenographic stroke information from the reference code information and stores this information in two separate files in memory 94. Memory 94 would typically be the permanent disk storage within the PC.

Once the disk reader utility has separated and stored the files, the CAT system operator utilizes a CAT translator program 96 to translate the stenographic stroke information into textual form. The textual form represents the vocabulary spoken during the proceedings, and also includes hidden stroke information used by the CAT software to correlate the translated text to the keystrokes from which it was generated. This translation process is commonly understood in the CAT industry. The translated text file is then edited by text editor 72 as before. The printer utility 74 utilizes both the reference code information and the edited text file to produce a final printed transcript 40.

Figure 4:
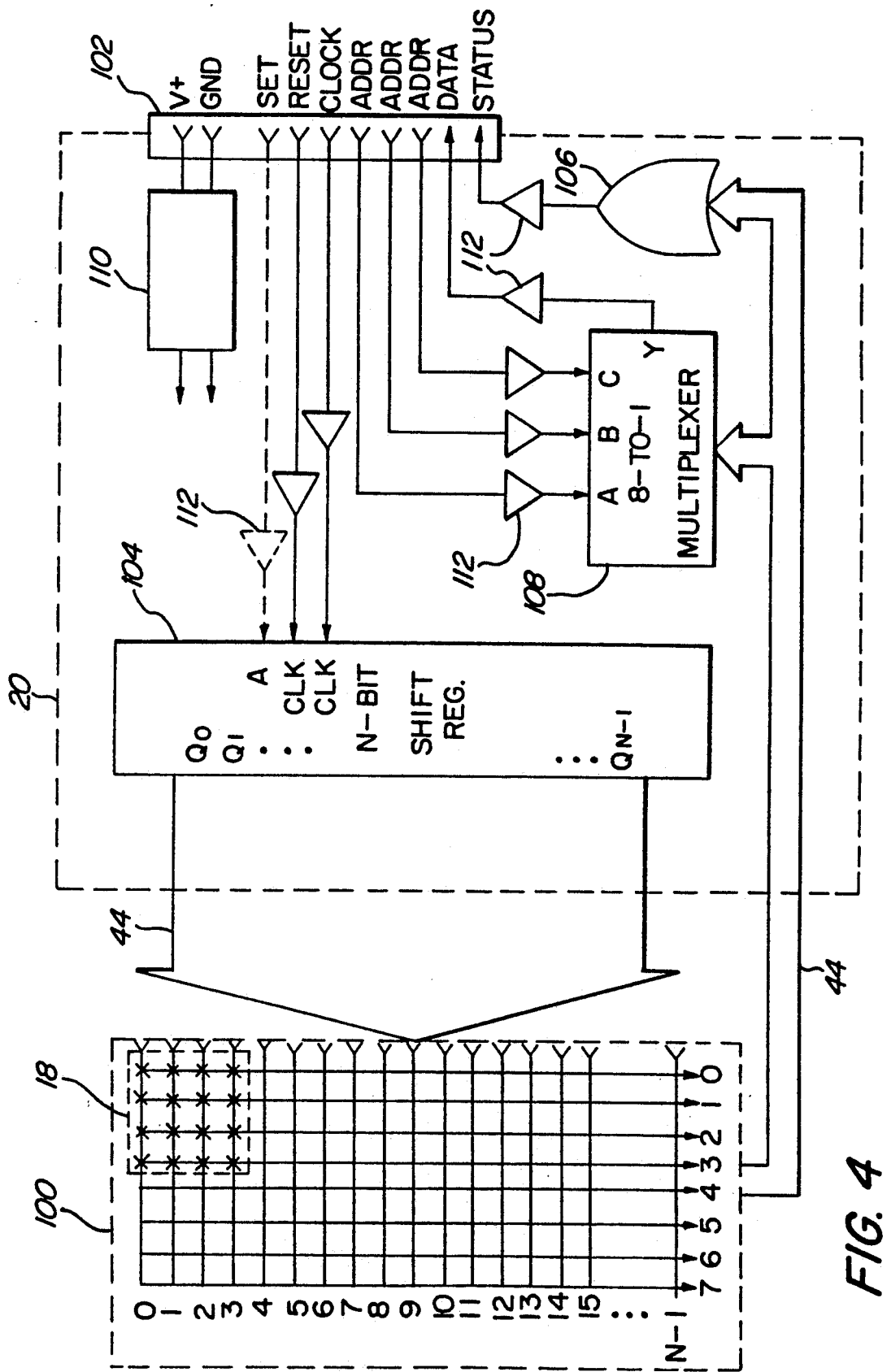
FIG. 4 is an electrical block diagram of one embodiment of the keypad and keypad controller circuitry used with the CAT system of FIG. 2.

FIG. 4 represents a block diagram of the electrical circuitry for the keypads 18 and the keypad controller 20 in accordance with the CAT system embodiment 50 of FIG. 2. As shown in FIG. 4, the keypad controller circuitry performs the function of scanning the keypad matrix 100 under control of the scan controller program residing the PC, which is coupled to the keypad controller 20 at connector 102.

The keypad matrix 100 is illustrated as an N×8 array having rows numbered 0 through N−1 and having columns numbered 0 through 7. The number of keypads 18 which can be scanned in the matrix is determined by the capability of the keypad controller 20, which is, in turn, dependent upon the size of the shift register 104 used to perform the scanning. It will be obvious to those skilled in the art that any number of keypads and any number of keys may be scanned. If, for example, 16 keypads are desired, each having 16 keys, the keypad controller 20 would be configured to scan 256 matrix points. As shown in FIG. 4, each keypad is arranged in a 4×4 matrix block, which is common in the industry. Two of the 4×4 matrix keypads can be scanned using four row lines and eight column lines. Accordingly, 16 of the 4×4 keypads can be scanned using 32 rows and 8 columns. In this embodiment, a group of five Signetics 74C164 8-bit serial-in parallel-out shift registers are used to scan the 32 rows. A Signetics 74C251 8-input multiplexer and an 8-input OR gate may be used to monitor the column status.

The scan controller program 66, running as a resident program on the PC 14, controls the keypad controller 20 through a cable 36 connected to connector 102 and the parallel port of the PC. With reference to the lines of connector 102, a RESET line is used to clear the shift register 104, such that all of its outputs are low. The scan controller uses the SET line to input a 1 bit into the shift register, and uses the CLOCK line to advance the shift register 104 one step for each clock pulse. As each row of the keypad matrix 100 is scanned, the column lines are monitored by a gate 106 to see if any key is pressed in that row. As each row is sequentially scanned, the status of gate 106 is checked. If one or more keys were pressed on that particular row, the STATUS output of the gate 106 would indicate that at least one in the row had been pressed. The scan controller uses the three ADDRESS lines to control an eight-to-multiplexer 108, which monitors the column lines. The state of any particular column line is then output by the multiplexer as the DATA line. This scanning procedure will be described in detail in accordance with the flowchart of FIG. 6.

Depending upon the particular hardware implementation of the system, a power converter 110 may be used to power the keypad controller 20. If a dedicated V+ line of connector 102 is used for the power supply line, then the power converter would simply filter this voltage and apply it to the keypad controller circuitry. If, however, a dedicated line is not available, then power converter 110 would derive voltage from the other input lines of connector 102 by using a diode and capacitor charging network. Note also that a number of data buffers 112 may be used on the input and output lines of connector 102 as required.

As can now be seen, the scan controller program 66 serves to control the shift register 104 and the multiplexer 108 to scan the keypad matrix 100. In the CAT system embodiment of FIG. 2, the scan controller function is performed by the PC 14 using the parallel port 64 connected via an eight or ten wire cable to keypad controller connector 102. If, however, the PC 14 is not available at the proceedings, then the scan controller may be combined with the keypad controller as shown in FIG. 3.

Figure 5:
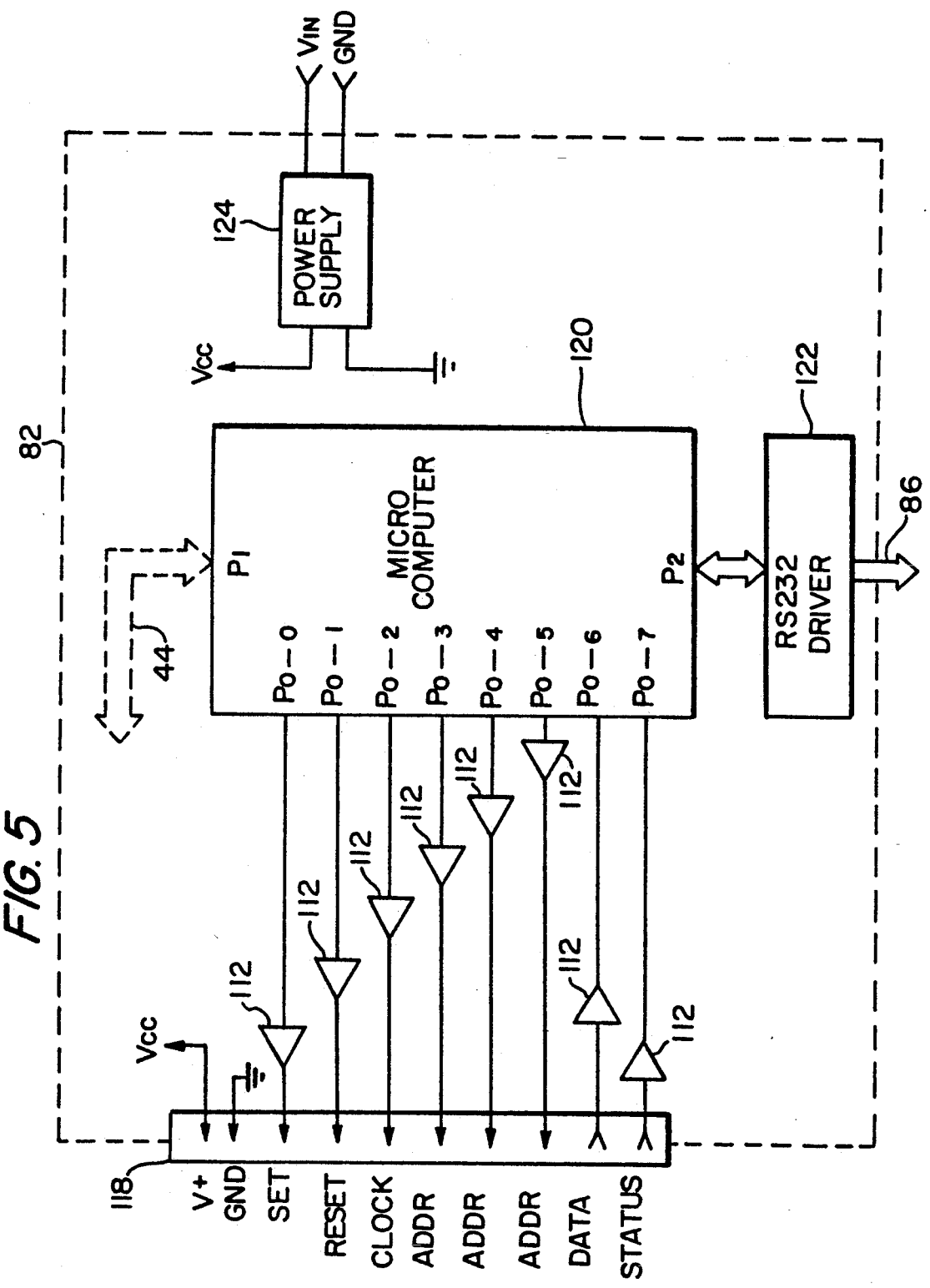
FIG. 5 is an electrical block diagram of one embodiment of the scan controller circuitry used with the CAT system of FIG. 3.

FIG. 5 illustrates one embodiment of the keypad and scan controller 82 of FIG. 3, wherein connector 118 can mate with connector 102 of the keypad controller illustrated in FIG. 4. This arrangement would allow the keypad and scan controller 82 to perform the scanning of a 32×8 matrix of 16 keypads. In that case, microcomputer 120 would control the shift register 104 and the multiplexer 108. However, if only four keypads are required in the particular CAT system, then the keypad controller circuitry of FIG. 4 may be omitted, and two 8-line input/output ports of microcomputer 120 may be directly coupled to control keypad matrix 100. In this instance, Port 0 of the microcomputer 120 would perform the row scanning and Port 1 would perform the column scanning, all without the use of a shift register.

In any case, the microcomputer 120 continuously scans the keypad matrix 100 and obtains information as to which key was pressed at what particular instant of time. The microcomputer then outputs this information at Port 2 as reference signals on a serial data bus 86 utilizing an RS232 driver 122. Such an RS232 driver is available from Intersil as ICL232. Either an 8749 or an 8051 microprocessor, both available from Intel Corporation, of San Jose, Calif., can be used as microcomputer 120, depending upon the RAM requirements to support the number of keypads.

As noted before, data buffers 112 may be used as required on each of the input/output lines. The SET line may or may not be required, depending upon the shift register configuration. A power supply 124 would typically provide regulated voltage for the keypad and scan controller 82. Note that in the embodiment where only four keypads are scanned directly from the microcomputer 120, then the data buffers 112 would have to be appropriately configured such that eight output lines from one port serve as row drivers, and eight input lines from another port serve as column receivers.

Figure 6:
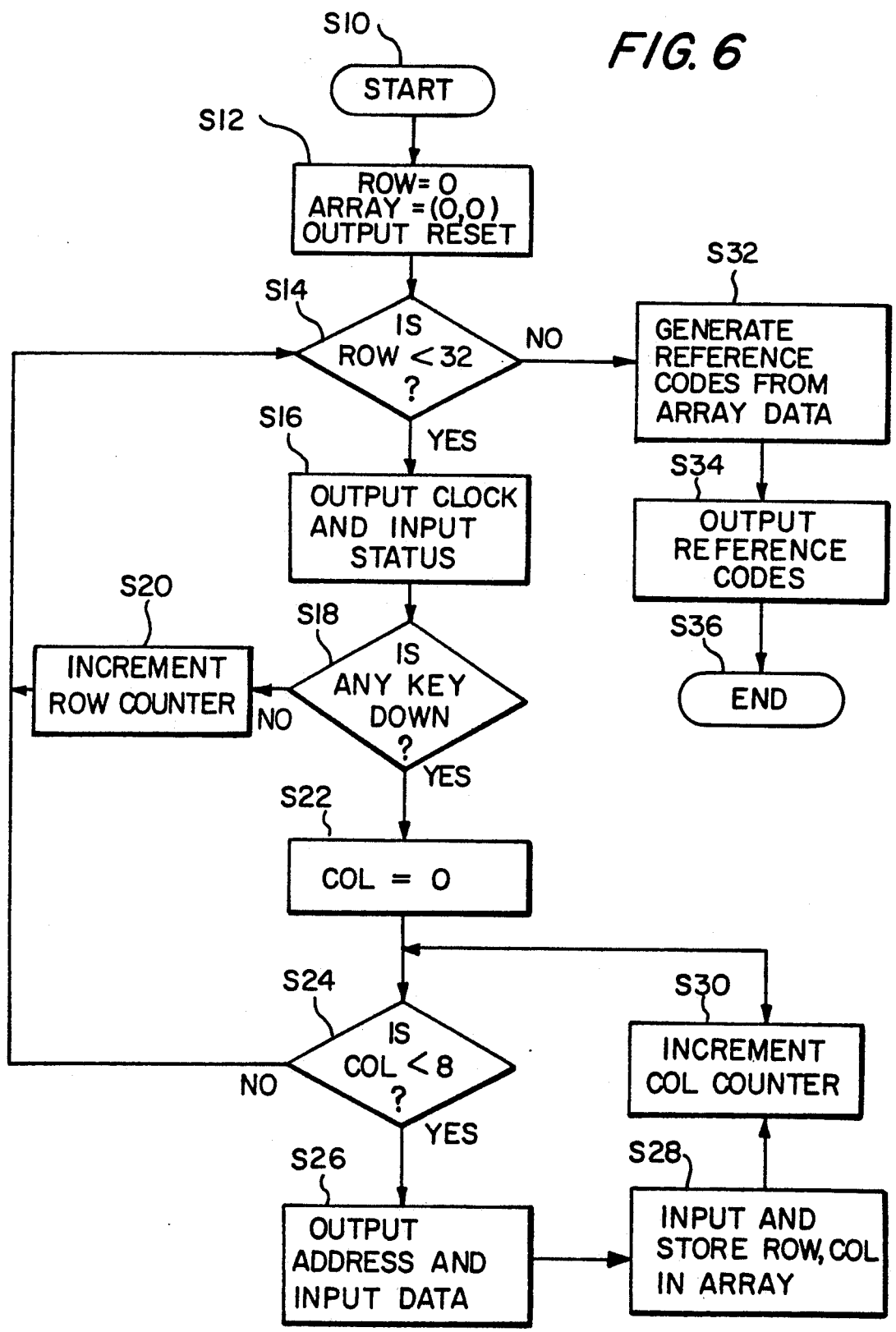
FIG. 6 represents a flowchart illustrating the specific sequence of operations performed by the scan controller in accordance with the practice of the present invention.

Referring now to FIG. 6, a flowchart for the scan controller is shown. Although this flowchart specifically illustrates the sequence of operations performed by PC-based scan controller 66 of CAT system 50, it may also be used to represent the general sequence of operations performed by microcomputer 120 in the keypad and scan controller 82. Any significant differences between the scan controller embodiments will be noted.

Beginning with start step S10, the row counter variable ROW is initialized to zero in step S12. Furthermore, a matrix of variables named ARRAY is also initialized to zero. The array size is 8 by 32. In the example, 16 4-by-4 keypad 18 matrixes are mapped onto the 8-by-32 array, representing 16 keypads 18 in the present embodiment. A RESET signal is output from the scan controller to clear the shift register 104, such that all its outputs are low.

In step S14, the row counter is tested to see if all of the rows have been scanned. In the example of a 32×8 matrix, if the row counter is less than 32, control proceeds to step S16, wherein a CLOCK pulse is output to the shift register. Assuming the SET line is high, the first clock pulse will cause the first row of keypad matrix 100 to go high. If any of the keys in that row are pressed, then one of the eight column lines will go high. This would cause the STATUS line to go high. Accordingly, step S16 also inputs the STATUS line.

In step S18, the STATUS line is evaluated to determine whether or not any key has been pressed. If no key was pressed, then step S20 increments the row counter and returns control to step S14 to test the next row. If a key was pressed in that row, then step S22 initializes the column counter COL, and control proceeds to test the column counter in step S24. If all eight columns have not yet been tested, then the scan controller outputs an address to multiplexer 108 via the ADDRESS lines in step S26 such that it can monitor the level of the particular column being addressed. After an appropriate settling time, the DATA line output from multiplexer 108 is input into the scan controller. In step S28, the scan controller inputs the data bit representative of the column addressed, and stores the bit at matrix variable location ROW, COL in the ARRAY. In step S30, the column counter is incremented. Control then returns to step S24 to again test the column counter. Once all eight columns have been read, then control returns to step S14 wherein the next row is selected.

After all 32 rows have been scanned, then control proceeds to step S32 wherein the scan controller generates reference codes from the data in the ARRAY. These reference codes are output in step S34, and processing ends at step S36. The reference code format will be explained in accordance with FIG. 8. The reference codes may either be output to buffer memory 68 in the CAT system 50 of FIG. 2, or may be output to the stenographic writer 84 of the CAT system 80 of FIG. 3 via the RS232 driver 122.

Figure 7:
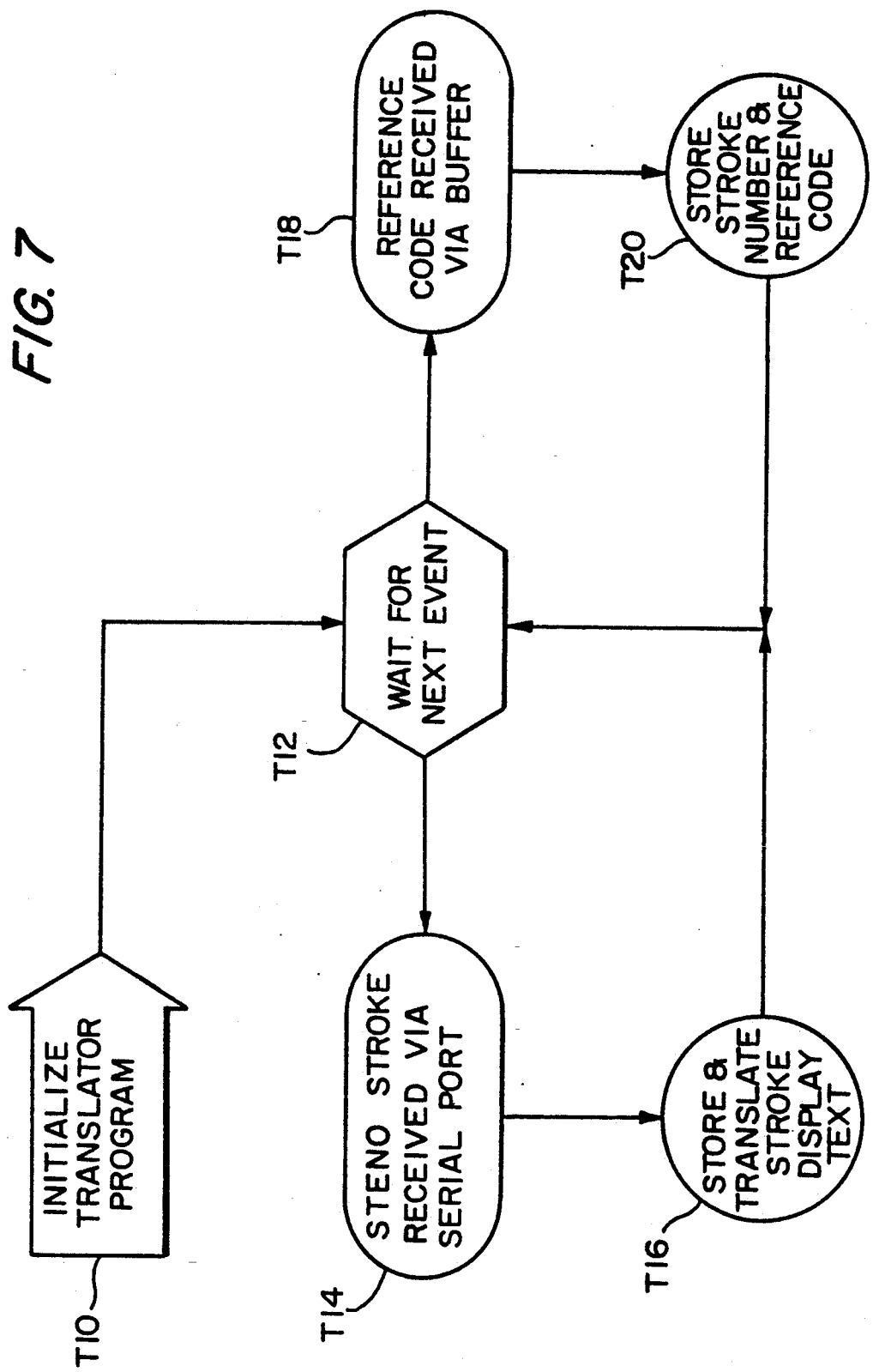
FIG. 7 is a software state diagram of the real-time translator program of FIG. 2, illustrating the transitions between software subroutines which occur in response to different input signals.

FIG. 7 represents a state diagram of the real-time translator program 60 of FIG. 2. The program is initialized in step T10, such that all variables are set to a known initial value and specifically the stroke count is set to zero.

It then transfers control to step T12 to wait for the next event. If stroke information has been transmitted from the stenographic writer 12 over the RS232 link, then step T14 instructs the program to obtain the stroke information from serial port 56 and stores it into memory 62 in step T16. As shown in FIG. 2, block 62. Hence, the real-time translator program 60 translates the stenographic signals received from the serial port into stenographic codes which are stored in memory. The translator's program 60 also perform the stroke translation and text display functions. Real-Time translation also displays the text.

The stenographic code, or stroke information, is typically composed of at least three bytes (24 bits) of information, although the specific representation of the stenographic code format may vary. Twenty-three bits may be used to represent the 23 keys of the stenographic keyboard 22, and the 24th bit would be a flag bit which would indicate that the stroke is of a special nature, such as an end-of-job indicator.

Figure 8:
FIG. 8 is a pictorial representation of the reference code file stored in the memory of FIG. 2.

Continuing with FIG. 7, if reference code information is present in the keyboard buffer 68, then step T18 transfers control to step T20 where the current stroke number is stored in memory 62 as part of the reference code format. As shown in FIG. 8, the reference codes in the preferred embodiment are stored as follows: a single byte containing the keypad number (e.g., a value of 1 to 16) and the particular key which has been pressed (e.g., a value of 1 to 16) in the upper and lower nibbles, respectively. For example, in FIG. 8, the reference codes indicate that after steno stroke number 185, the user of keypad B pressed his fifth key, corresponding to key number E. Each of these four-bit nibbles are stored in ASCII representation with a carriage return/line feed character following the byte. However, the specific representation of the reference code format chosen for this implementation is just one of many possible ways to record the keypad information.

Figure 9:
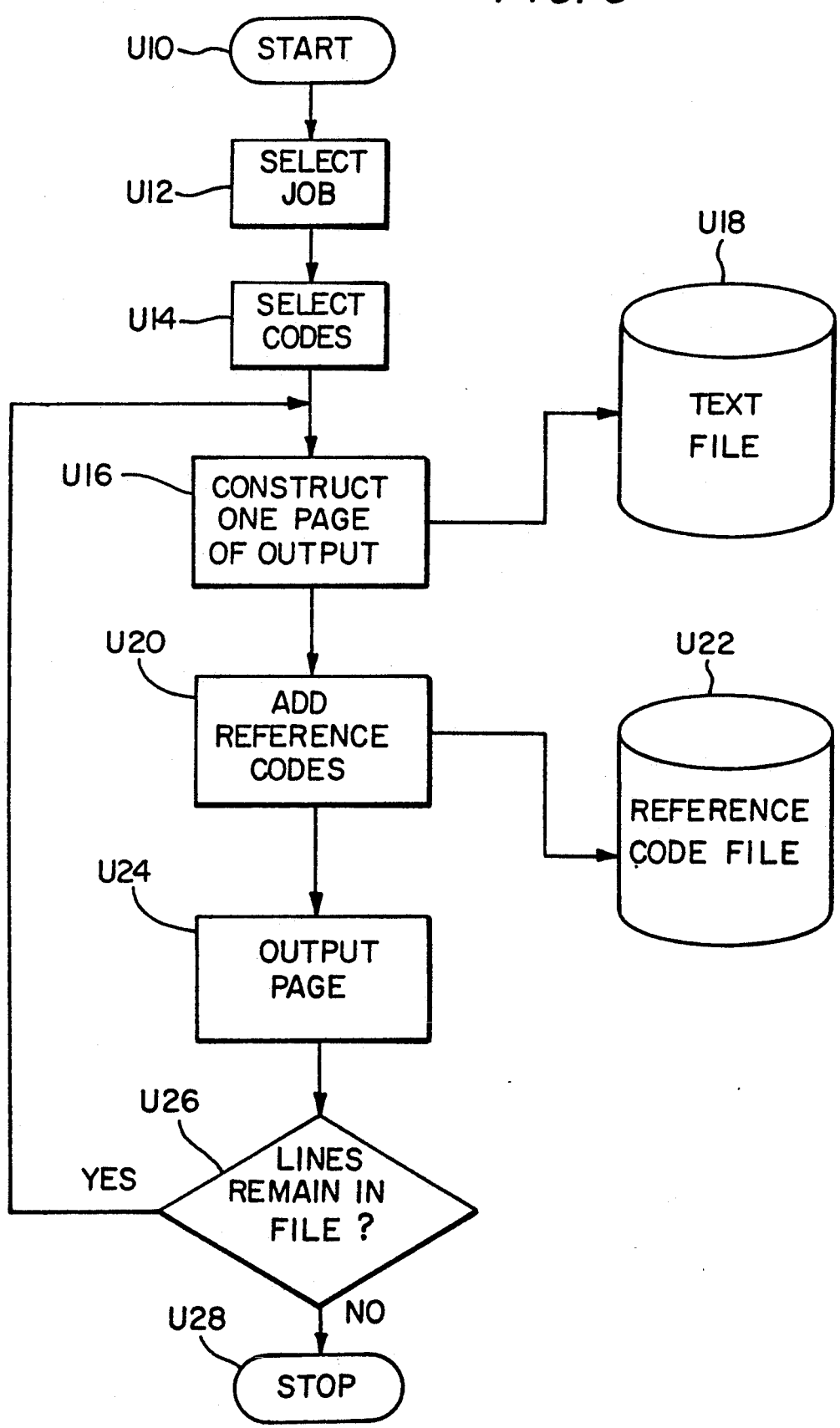
FIG. 9 is a software state diagram of the printer utility program for the CAT system of the present invention.

FIG. 9 is a state diagram of the printer utility program 74, which illustrates how the CAT system of the invention utilizes both the reference code information and the edited text information to create the printed transcript 40.

FIG. 9 depicts the CAT print utility function. Most CAT systems provide an ability to output a transcript according to a pre-defined, regional format. Each Court Reporter is required to produce a finished transcript upon request by the Court or attorneys. Such transcripts must conform to the regional format, and are signed by the Reporter as being complete and correct.

FIG. 9 is a flowchart of such a formatting program, with specific modifications to accommodate the present invention. At the system user's discretion, the print utility is initiated; whereupon a transcript to be printed is selected U12 from those available in memory 62 (which is usually a permanent storage magnetic disk media). The user is then prompted to select the reference codes to be included on the pages of the transcript to be printed U14. The user specifies one or more of the keypad 18 reference codes ('A' to 'P' for a 16 keypad system) to be printed.

Having selected a transcript U12 and reference code(s) U14 to be printed, the Print Utility reads lines U16 from the transcript file U18 until an entire page of printed output is constructed in RAM in exactly the ASCII character image to be printed. Each line of the transcript which was read has associated with it the stenographic stroke number of the first word on each line. In step U20, the reference code file U22 is searched for the occurrence of any reference codes in the set selected by the user in step U14. Of these, the associated stroke numbers (as shown in FIG. 8) are compared to each line's beginning stroke number. When a reference code's stroke number is found to be greater than or equal to a line's beginning stroke number and less than the next line's stroke number, then the code will be printed on that line.

Reference codes are placed on appropriate lines either 2 columns to the right of the transcript graphic box or 4 columns to the right of the right margin of the transcript text, whichever is greater (as shown in FIGS. 10a and 10b). The format of the reference code on the printed page is shown in FIG. 10a and 10b, and is composed of one upper case alphabetic character representing a keypad 18 in the range 'A'-'P' followed by one or two numeric characters representing a key 42 in the range '1'-'16' with no intervening space. In the event that more than one of the selected reference codes occur on the same line, said reference codes will be printed on subsequent lines until all reference codes associated with said line have been printed.

When an entire page of output has been formatted, the page is output U24 on the printer 16. If the page is not full, then control passes to U26 which checks for the presence of additional lines in the input file U18. If true, then control passes to U16, and processing continues as described above. However, if U26 is not true, then the pending page is output using the routine U24, and the program terminates U28.

FIGS. 10a and 10b illustrate a specific example of a printed transcript having the reference characters printed in the margins in the "XNN" format discussed above. Both FIGS. 10a and 10b are identical with respect to the printed textual material. However, FIG. 10a includes reference characters in the margins which correspond to the responses of the user of the third keypad C. Hence, the third user would only be provided with a transcript having a C as its first character of the reference characters. The second character represents the key number which was pressed on keypad C. Similarly, FIG. 10b represents the same information for the user of the first keypad A. By placing the reference characters in the margin as shown, each individual user can readily locate any specific portion of the transcript.

Figure 11:
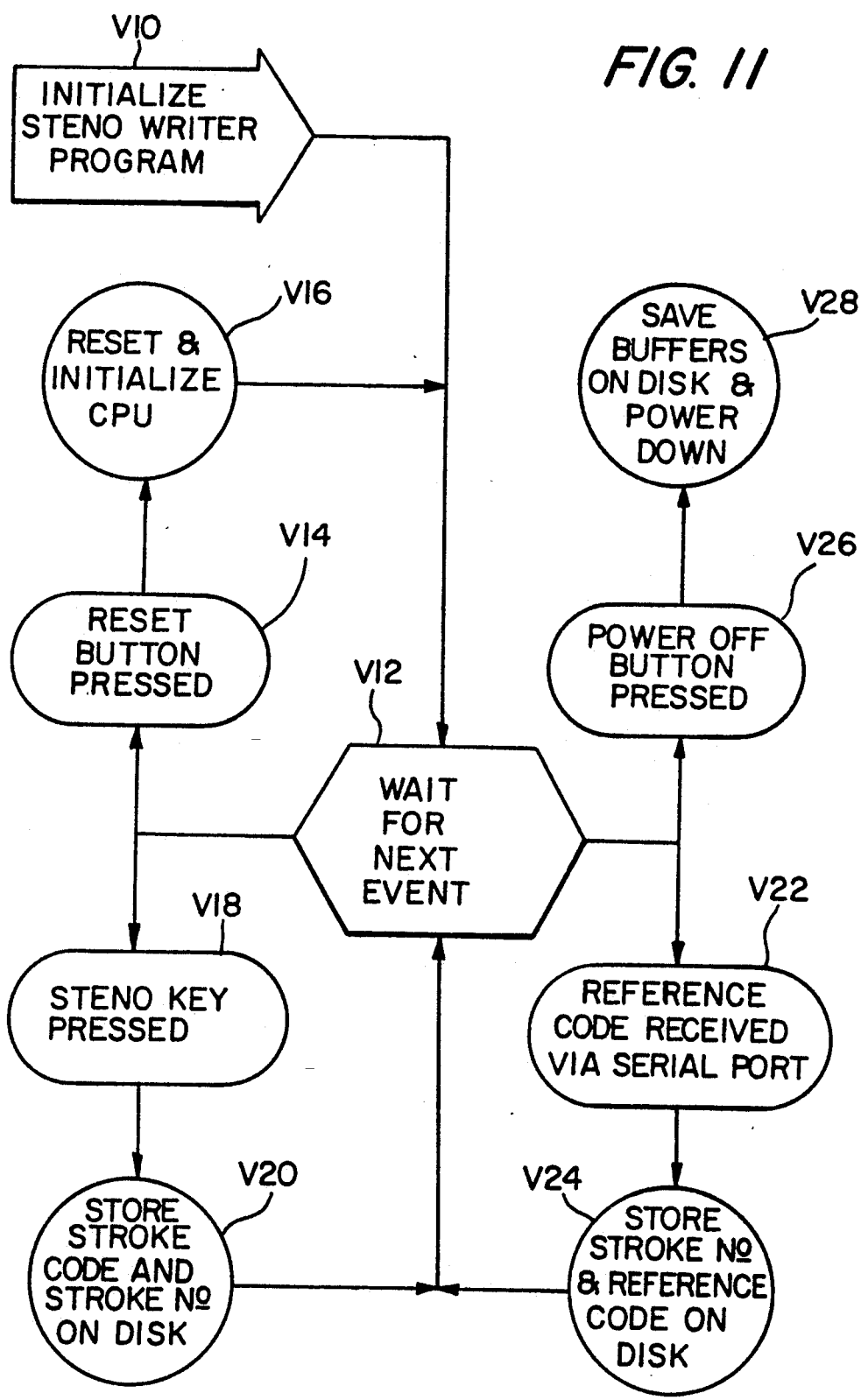
FIG. 11 is a software state diagram for the computer program stored in the PROM of the stenographic writer of FIG. 3.

FIG. 11 is a state diagram of the stenographic writer program stored in PROM 88 of FIG. 3. The steno writer is initialized so that all values are in a known state. The next state that the software goes into is waiting for an event. Waiting for an event is marked as V12. One of the events is that a reset button has been pressed on the steno writer that is listed as V14. This causes a reset and initialization of the CPU at its original known state so all values are initialized to a known state and then it returns to waiting for a next event. Another event is V18 which is a steno key was pressed. This causes the following action as described in V20 in the drawing, it stores a stroke code and stroke number on disk and then returns to wait for an event. The next event that can happen is listed as V22 a reference code has been received via the serial port. This causes the stroke and the numbered reference code to be stored on disk V20. Then it returns to waiting for the next event. Lastly, we have V26, the power off button has been pressed and the action that is taken at that time is listed as V28, the buffers are saved on disk and then the unit powers itself down.

Figure 12:
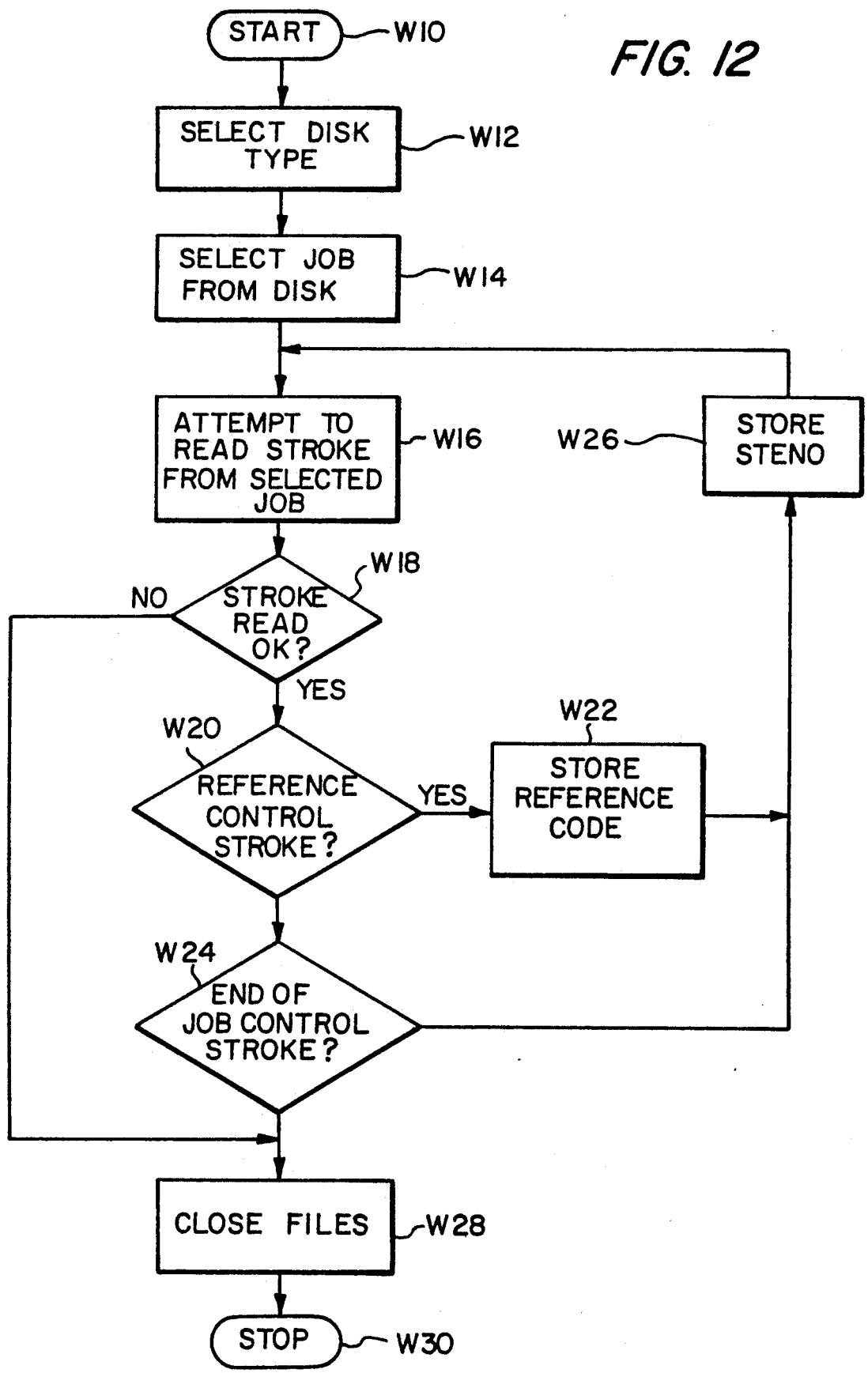
FIG. 12 is a software state diagram of the disk reader utility program for the CAT system illustrated in FIG. 3.

FIG. 12 is a state diagram of the disk reader utility program 92 residing in the PC in the CAT system embodiment of FIG. 3.

The purpose of the DISK READER UTILITY 92 is to read the disks produced by a stenographic writer 12. FIG. 12 is a flowchart of the processing performed by the DISK READER UTILITY 92. After a user selects the type of stenographic writer used to produce the disk 58 in step W12, the user is prompted to select one of the jobs on the stenographic writer disk 58 in step W14. The DISK READER UTILITY 92 then attempts to read a stroke in step W16 from the selected job from step W14. A decision W18 branches to step W28 (described below) if a stroke could not be read; otherwise a branch to decision W20 is made if successful. W20 branches to W22 to store the reference code in memory 62 (also see FIG. 8) and transfers control to W26 (described below) if the stroke is a reference stroke. Otherwise, W20 branches to W24 to test if the stroke indicated end-of-job, which causes control to pass to W28 to close all open files and terminate the program if true. Otherwise control is passed to W26, which stores the stroke in a steno file in memory 62. Control then transfers to W16 (described above).

The foregoing specification describes only the preferred embodiment of the invention as shown. Other embodiments besides the ones described may be articulated as well. The terms and expressions therefore serve only to describe the invention by example only and not to limit the invention. It is expected that others will perceive differences which while differing from the foregoing, do not depart from the spirit and scope of the invention herein described and claimed.

What is claimed is:

1. A system for providing a textual record of spoken words, said textual record having markings selectively provided by a plurality of system users, said system comprising:
   means for inputting keystrokes by a first user which are representative of spoken words, providing a plurality of stroke signals; and
   means, independent of said keystroke inputting means, for substantially simultaneously inputting reference markings from at least a second user, providing a plurality of reference markings corresponding to the stroke signals.

2. A system for providing a textual record of spoken words, said textual record having markings selectively provided by a plurality of system users, said system comprising:
   means for inputting keystrokes by a first user which are representative of spoken words, providing a plurality of stroke signals;
   means, independent of said keystroke inputting means, for substantially simultaneously inputting reference markings that uniquely identify at least a second user, providing a plurality of reference markings uniquely identifying a second user; and
   means for processing said stroke signals and said reference markings to provide a combined electronic record of said spoken words and said second user's reference markings.

3. A system for providing a textual record of spoken words, said textual record having markings selectively provided by a plurality of system users, said system comprising:
   means for inputting keystrokes by a first user which are representative of spoken words, providing a plurality of stroke signals;
   means, independent of aid keystroke inputting means, for substantially simultaneously inputting reference markings unique to at least a second user, providing a plurality of reference markings;
   means for processing said stroke signals and said reference markings to provide a combined electronic record of said spoken words and said second user's reference markings; and
   means for providing a textual record from said combined electronic record, said textual record having reference markings unique to said second user placed at locations within said textual record as directed by said second user through said substantially simultaneous inputting means.

4. The system according to claims 1 or 2 or 3 wherein said textual record includes only those stroke signals corresponding to the reference markings provided by said second user.

5. The system according to claims 1 or 2 or 3 wherein said substantially simultaneous inputting means is at least one electronic switch.

6. The system according to claim 5, wherein said said substantially simultaneous inputting means includes means for scanning said at least one electronic switch.

7. The system according to claims 1 or 2 or 3 further comprising means for storing said stroke markings and said reference signals in memory.

8. The system according to claim 3 wherein said processing means includes means for translating said reference markings into user-readable reference markings.

9. The system according to claim 8, wherein said textual record providing means includes means for selectively positioning said reference markings at a location substantially adjacent to the portion of the textual record corresponding to the words spoken during the inputting of said second user's reference markings.

10. A computer-aided transcription system comprising:
   first means for inputting a first set of physical responses to a series of events, said first means adapted for use by a stenographic reporter, said first means producing stenographic signals;
   a plurality of second means for inputting at least a second and third set of physical responses to said series of events, said second and third set of physical responses provided by a plurality of individual users of said system other than said stenographic reporter while said first set of physical responses are being input, said plurality of second means producing reference signals;
   means for storing said stenographic signals and said reference signals;
   means for translating said stenographic signals into textual codes;

means for translating said reference signals into reference codes; and means for printing individualized transcripts for said individual users from said textual codes and said reference codes, each of said transcripts having a plurality of reference codes strategically placed at a location within said transcripts corresponding to only one particular individual user's responses.

11. A method of providing a textual record of spoken words, the method comprising the steps of:
- inputting a first set of physical responses corresponding to spoken words into a first electronic device, producing a first set of signals;
- inputting reference markings uniquely identifying at least one user into a second electronic device;
- translating said first set of signals into textual information;
- translating said reference markings into reference characters; and
- providing a textual record of spoken words from said textual material and said reference characters such that said textual record generally corresponds to said spoken words at the occurrence of said reference characters.

12. A stenographic transcription machine adapted for use with a computer-aided transcription system having the capability to selectively provide reference markings within the final transcript in response to a plurality of input signals provided by a plurality of users other than said stenographic reporter, said stenographic transcription machine comprising:
- transcriber means for making a stenographic record of spoken words;
- a plurality of external switch means for providing a plurality of reference signals from users other than said stenographic reporter; and
- controller means for monitoring said plurality of switch means and for providing a plurality of reference signals to said stenographic transcriber in response thereto;
- said transcriber means including microprocessor means for controlling said transcriber means in response to a set of programmed instructions, memory means for containing said programmed set of instructions, disk means for storing said stenographic record, and port means for receiving said reference signals, said set of instructions being programmed to direct said disk means to store said stenographic record in such a manner that a certain portion of said stenographic record can be identified by said reference signals.

13. A computer adapted for use in a stenographic transcription system having the capability of providing reference characters at particular locations within the stenographic transcript, said computer comprising:
- means for controlling said computer;
- means for receiving a series of stenographic signals;
- means for translating said stenographic signals into textual material;
- means for storing said textual material;
- means for editing said textual material;
- means for receiving a plurality of reference signals, said reference signals representing responses from a plurality of system users;
- means for translating said reference signals into reference codes such that said reference codes provide an indication of when said reference signals were received, and which system user provided a particular reference signal;
- means for selecting only those reference codes provided by a particular user; and
- means for printing said edited textual material and said selected reference codes in a particular format such that each particular user can identify a portion of said textual material corresponding to when a particular response was provided by that user.

* * * * *